(12) United States Patent
Leboeuf et al.

(10) Patent No.: US 9,990,783 B2
(45) Date of Patent: Jun. 5, 2018

(54) REGULATING VEHICLE ACCESS USING CRYPTOGRAPHIC METHODS

(71) Applicant: GM GLOBAL TECHNOLOGY OPERATIONS LLC, Detroit, MI (US)

(72) Inventors: Karl B. Leboeuf, Windsor (CA); Ramie Phillips, III, Rochester Hills, MI (US); Earnest A. Lucitte, III, Southgate, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 15/044,990

(22) Filed: Feb. 16, 2016

(65) Prior Publication Data
US 2017/0236343 A1    Aug. 17, 2017

(51) Int. Cl.
| | | |
|---|---|---|
| G07C 9/00 | (2006.01) | |
| H04L 9/30 | (2006.01) | |
| H04L 29/06 | (2006.01) | |
| H04W 4/04 | (2009.01) | |

(52) U.S. Cl.
CPC ..... *G07C 9/00007* (2013.01); *G07C 9/00103* (2013.01); *H04L 9/30* (2013.01); *H04L 63/0823* (2013.01); *H04L 2209/24* (2013.01); *H04L 2209/80* (2013.01); *H04W 4/046* (2013.01)

(58) Field of Classification Search
CPC .................................................. G07C 9/00103
See application file for complete search history.

(56) References Cited

U.S. PATENT DOCUMENTS

| | | | |
|---|---|---|---|
| 7,246,744 B2* | 7/2007 | O'Brien | G07C 9/00103 235/382 |
| 7,389,530 B2* | 6/2008 | Raghunath | G07C 9/00309 713/155 |

* cited by examiner

*Primary Examiner* — Daniell L Negron
(74) *Attorney, Agent, or Firm* — Reising Ethington, P.C.

(57) ABSTRACT

A system and method of regulating access to a vehicle from a wireless device communicating using short-range wireless communications includes: transmitting a vehicle access certificate signing request from the wireless device to a central facility; receiving an authenticated vehicle access certificate from the central facility in response to the vehicle access certificate signing request, wherein the authenticated vehicle access certificate is signed using a central facility private key and includes the wireless device public key; transmitting the authenticated vehicle access certificate containing the wireless device public key from the wireless device to the vehicle via a short-range wireless communications protocol; receiving from the vehicle a shared secret that is encrypted by the wireless device public key; decrypting the received shared secret using a wireless device private key; generating a command controlling vehicle functions; and transmitting the command from the wireless device to the vehicle.

7 Claims, 2 Drawing Sheets

REGULATING VEHICLE ACCESS USING CRYPTOGRAPHIC METHODS

TECHNICAL FIELD

The present invention relates to regulating vehicle access and, more particularly, to regulating such access via cryptographically-secured vehicle access certificate signing requests.

BACKGROUND

Vehicle access has traditionally been controlled by one or more physical keys. When a vehicle owner or user possesses the physical keys, the user could insert a key into a lock and unlock the vehicle doors or into an ignition and start the vehicle engine. As vehicle technology evolved, the vehicle keys remained physical but were implemented as passive devices that wirelessly communicated with the vehicle to provide access. The passive device includes a wireless transmitter that the vehicle owner/user carries to gain access to the vehicle and its functionality. These mechanisms of regulating vehicle access involve physical possession of a dedicated key or device to operate the vehicle. While physical keys/devices are reliable and effective, it may be inconvenient to deliver them to a person who needs access to a vehicle. Regulating vehicle access via a wireless device that can wirelessly receive virtual keys and use those virtual keys to control vehicle access increases the flexibility with which users are granted access to the vehicle.

SUMMARY

According to an embodiment of the invention, there is provided a method of regulating access to a vehicle from a wireless device communicating using short-range wireless communications. The method includes transmitting a vehicle access certificate signing request from the wireless device to a central facility, wherein the vehicle access certificate signing request includes a wireless device public key; receiving an authenticated vehicle access certificate from the central facility in response to the vehicle access certificate signing request, wherein the authenticated vehicle access certificate is signed using a central facility private key and includes the wireless device public key; transmitting the authenticated vehicle access certificate containing the wireless device public key from the wireless device to the vehicle via a short-range wireless communications protocol; receiving from the vehicle a shared secret that is encrypted by the wireless device public key; decrypting the received shared secret using a wireless device private key; generating a command, controlling one or more vehicle functions, that is authenticated using the shared secret; and transmitting the command from the wireless device to the vehicle telematics unit.

According to another embodiment of the invention, there is provided a method of regulating access to a vehicle from a wireless device communicating using short-range wireless communications. The method includes receiving, at the vehicle, an authenticated vehicle access certificate that is sent from the wireless device via short-range wireless communications, wherein the vehicle access certificate has been authenticated by a central facility; validating the authenticated vehicle access certificate at the vehicle using a central facility public key; generating a shared secret at the vehicle when the authenticated vehicle access certificate is valid; encrypting the shared secret at the vehicle using a wireless device public key; transmitting the encrypted shared secret from the vehicle to the wireless device via short-range wireless communications; receiving, at the vehicle, a command controlling one or more vehicle functions sent from the wireless device; authenticating the command using the shared secret; and controlling one or more vehicle functions.

According to another embodiment of the invention, there is provided a method of regulating access to a vehicle from a wireless device communicating using short-range wireless communications. The method includes transmitting a vehicle access certificate signing request from a wireless device to a central facility, wherein the vehicle access certificate signing request includes a request to access a vehicle and a wireless device public key; adding one or more entitlement fields to the vehicle access certificate signing request that control access to the vehicle; creating an authenticated vehicle access certificate by signing at least a portion of the vehicle access certificate signing request at the central facility using a central facility private key, wherein the authenticated vehicle access certificate includes the wireless device public key and the one or more entitlement fields; transmitting the authenticated vehicle access certificate from the central facility to the wireless device via a wireless carrier system; transmitting the authenticated vehicle access certificate and a wireless device public key from the wireless device to the vehicle via a short-range wireless communications protocol; validating the authenticated vehicle access certificate at the vehicle using a central facility public key; generating a shared secret at the vehicle when the authenticated vehicle access certificate is valid; encrypting the shared secret using the wireless device public key; transmitting the encrypted shared secret from the vehicle to the wireless device via the short-range wireless communications protocol; decrypting the received shared secret at the wireless device using a wireless device private key; generating a command controlling one or more vehicle functions that has been authenticated using the shared secret; and transmitting the command from the wireless device to the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
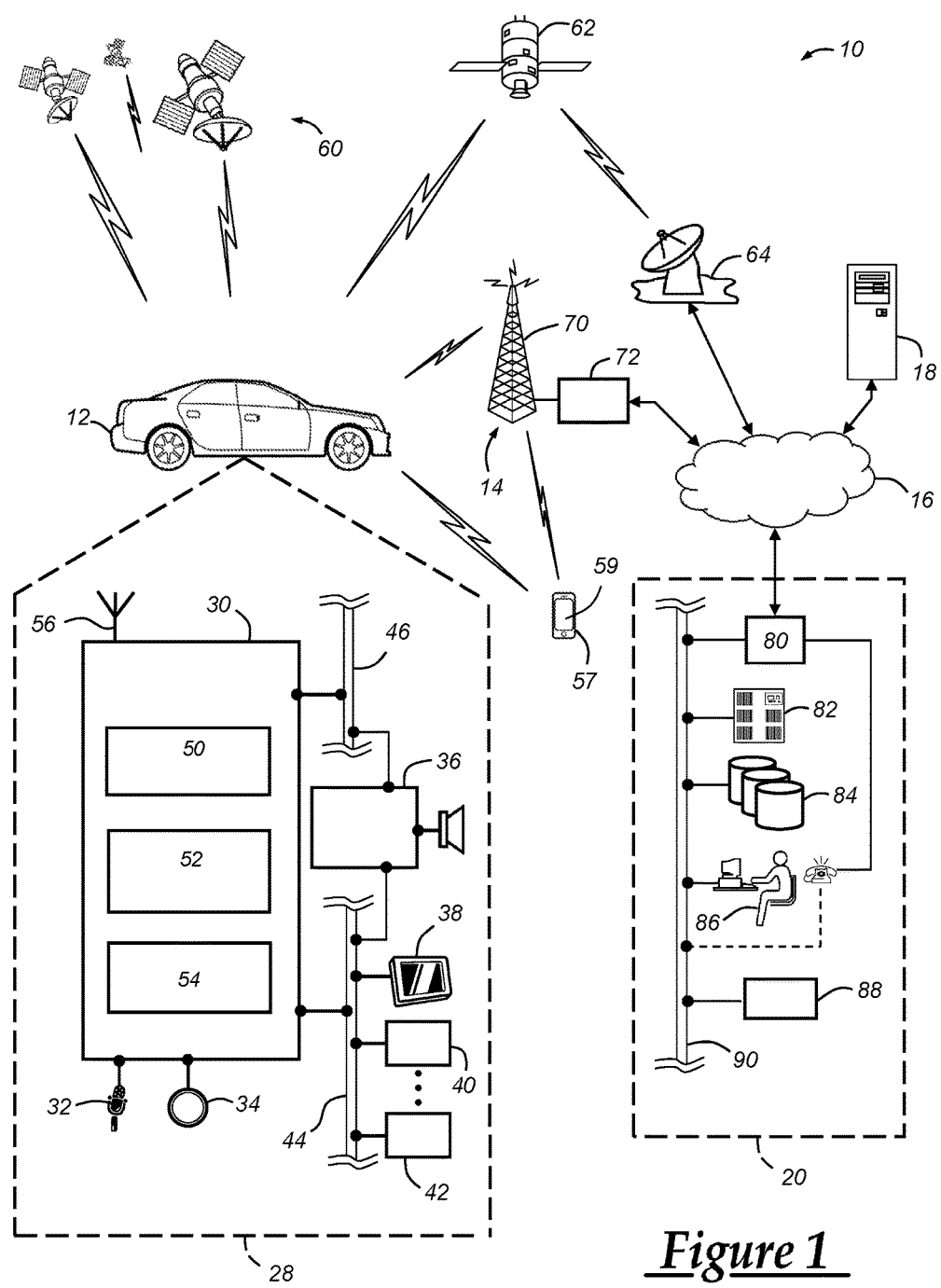
FIG. 1 is a block diagram depicting an embodiment of a communications system that is capable of utilizing the method disclosed herein.

The system and method described below enables a wireless device to request vehicle access from a central facility and in return receive an authenticated vehicle access certificate that the wireless device may use to access the vehicle along with public/private keys of the wireless device. For example, a user can direct the wireless device to request vehicle access by creating a vehicle access certificate signing request that it sends to a central facility. The wireless device may generate its own set of cryptographic keys; a wireless device private key and a wireless device public key. The vehicle access certificate signing request includes the wireless device public key, which can be bound to the identity of the wireless device when authenticated by the central facility via a digital signature created using a central facility private key thereby creating an authenticated vehicle access certificate. The wireless device may send a vehicle identifier to the central facility along with the vehicle access certificate signing request. The central facility can receive the vehicle access certificate signing request from the wireless device and determine whether the wireless device should have access to the vehicle based on the identity of the wireless device or user and the vehicle identifier. If access is granted, the central facility can encode one or more permissions into the vehicle access certificate. After the central facility has encoded the permissions into the vehicle access certificate, the central facility uses its private key to sign the vehicle access certificate signing request thereby authenticating it. The central facility can then wirelessly transmit the authenticated vehicle access certificate to the wireless device, which then communicates this certificate to the vehicle to gain access.

The vehicle includes a copy of the central facility public key that has been stored there prior to receiving the authenticated vehicle access certificate. After receiving the authenticated vehicle access certificate and wireless device public key from the wireless device via short-range wireless communications, the vehicle can authenticate them by verifying the authenticated vehicle access certificate encrypted with the central facility private key using the copy of the central facility public key. Successful verification of the authenticated vehicle access certificate indicates that the wireless device public key and the permissions included in the authenticated vehicle access certificate are valid. Given that the vehicle can verify the authenticated vehicle access certificate using the previously-stored central facility public key, the vehicle can grant or deny vehicle access without the need to communicate with the central facility.

The vehicle can then generate a shared secret that will be stored at the vehicle and transmitted to the wireless device. The shared secret can be used as part of symmetric encryption of commands issued by the wireless device to control vehicle function, generation of message authentication codes for a challenge/response mechanism, or both. The vehicle can generate a shared secret, such as a randomly generated number, and encrypt the shared secret using the wireless device public key. After encryption, the shared secret can be wirelessly transmitted to the wireless device via short-range wireless communications. The wireless device can decrypt the shared secret using its private key and store the secret in its memory device.

When the wireless device generates commands to control vehicle functions, the vehicle can verify those commands using the shared secret. One mechanism for verifying these commands involves a challenge/response mechanism using the shared secret. This will be discussed below in more detail. Using the authenticated vehicle access certificates facilitate a system in which access to the vehicle is granted at a central facility, not dependent on possession of physical key fobs, and controlled with a responsiveness similar to existing passive entry passive start (PEPS) key fobs. More specifically, the system and method described herein provides a wireless device that, after receiving the shared secret, can unlock or lock vehicle doors within 200 milliseconds (ms) of initiating the command or start the propulsion system of the vehicle within 400 ms. Apart from its responsiveness, the system and method also does not rely on any security mechanisms inherently provided by the wireless communication path through which communications are sent, such as the short-range wireless communications or the wireless carrier system.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, Bluetooth Low Energy (BLE), or near field communication (NFC). When used for packet-switched data communication such as TCP/IP, the telematics unit can be configured with a static IP address or can set up to automatically receive an assigned IP address from another device on the network such as a router or from a network address server.

Other embodiments of the vehicle 12 are possible in which the vehicle is only equipped with short-range wireless communications capabilities. In addition to vehicles having a vehicle telematics unit that can communicate using cellular communications protocols via the cellular chipset along with short-range wireless communications, the disclosed methods can be implemented using a vehicle telematics unit that lacks the cellular chipset and can only communicate via short-range wireless communications protocols. Or in another implementation, the vehicle may not be equipped with a vehicle telematics unit but may, nonetheless, possess an ability to wirelessly communicate via one or more short-range wireless communications protocols or techniques. Such an arrangement could be implemented in a vehicle that communicates via short-range wireless communications using a VSM 42 or other ECU on the vehicle 12. The VSM 42 can be solely dedicated to short-range wireless communications, such as a BLE VSM that includes its own short-range wireless antenna, and communicatively linked to other portions of the vehicle electronics 28 via the communications bus 44 or the entertainment bus 46. In other implementations, an infotainment head unit (IHU) of the audio system 34 could include a dedicated antenna and have the capability to communicate wirelessly via short-range wireless communications protocols and carry out the steps of the disclosed methods. The functionality of the vehicle telematics unit described below with respect to the methods, such as the random number generator, can be fully implemented using the VSM 42 or the IHU.

One of the networked devices that can communicate with the telematics unit 30 is a wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple and the Galaxy™ manufactured Samsung as well as others. While the smart phone 57 may include the ability to communicate via cellular communications using the wireless carrier system 14, this is not always the case. For instance, Apple manufactures devices such as the various models of the iPad™ and iPod Touch™ that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the smart phone 57, for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
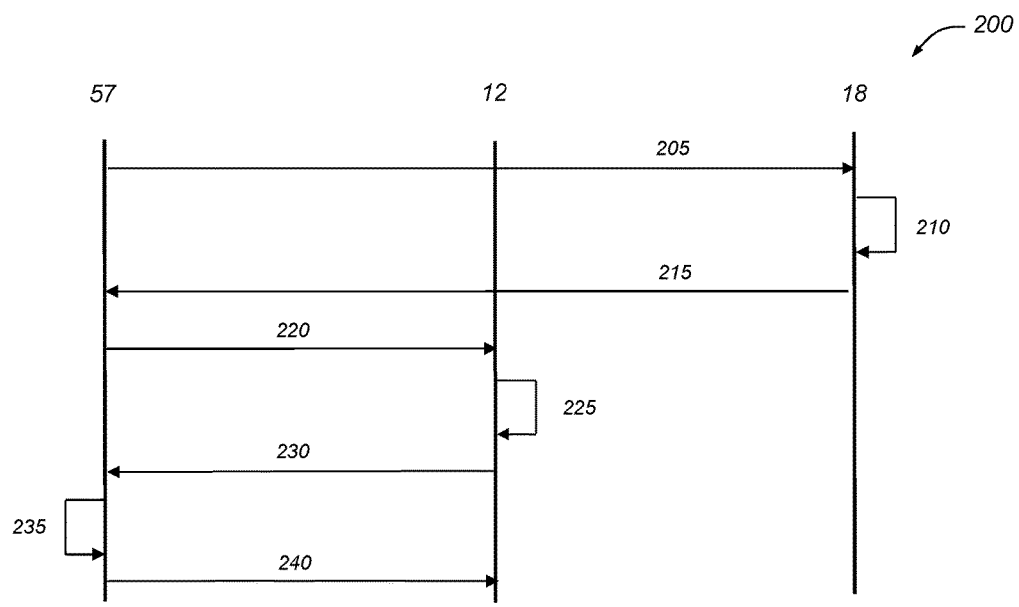
FIG. 2 is a communications flow depicting an embodiment of a method of regulating access to a vehicle from a wireless device communicating using short-range wireless communications.

Turning now to FIG. 2, there is shown an embodiment of a method 200 of regulating access to the vehicle 12 from the smart phone 57 communicating using short-range wireless communications. The method 200 begins at step 205 by transmitting a vehicle access certificate signing request from the smart phone 57 to a central facility, such as a back office implemented by the computer 18 or the call center 20. For purposes of illustration, the central facility will be described in this embodiment in terms of the computer 18. However, it should be appreciated that the call center 20 or other central facility could be substituted with equal success. Also, portions of this method 200 can be implemented using the processor 52 of the vehicle telematics unit 30, the computer processing capabilities of one or more VSMs 42, such as a body control module, or both.

When the smart phone 57 initiates the process of gaining access to the vehicle 12 or controlling the functionality of the vehicle 12, the phone 57 generates a pair of cryptographic keys used by the smart phone 57; a wireless device private key and a wireless device public key. The smart phone 57 can create the cryptographic key pair locally or request the computer 18 generate the key pair remotely. In implementations in which the computer 18 receives the request for cryptographic keys, the computer 18 can provide the wireless device private key and a wireless device public key to the smart phone 57 via the wireless carrier system 14 using asymmetric encryption techniques that are understood by those skilled in the art. It is possible to generate the wireless device private key and a wireless device public key using elliptic curve cryptography (ECC) algorithms, such as the ECC P-256 algorithm.

After generating or otherwise obtaining the wireless device private key and wireless device public key, the smart phone 57 can create a vehicle access certificate signing request which includes a request to access the vehicle 12. The vehicle access certificate can be requested from the computer 18 with a certificate signing request (CSR) that includes the wireless device public key and a vehicle identifier for the vehicle 12 to be accessed, entitlement or permission fields that identify the level of access the smart phone 57 will be entitled to, or both. The smart phone 57 can then sign the vehicle access certificate using a signature algorithm or scheme and the wireless device private key to authenticate the certificate to the computer 18 as being sent from the smart phone 57. Signature algorithms and signature verification algorithms can employ a hash function as part of the signing/verifying process. A variety of different signature algorithms and signature verification algorithms can be used with the method, including a Digital Signature Algorithm (DSA), an Elliptic Curve Digital Signature Algorithm (ECDSA), an RSASSA-PSS (RSA signature scheme with appendix-probabalistic signature scheme), and RSASSA-PKCS1-v1_5 (RSA signature scheme with appendix-public key cryptography standard #1, version 1.5).

The entitlement fields can be inserted into the vehicle access certificate by the smart phone 57 or by the computer 18 after it receives the certificate from the phone 57. Entitlement fields can identify the vehicle functions that the smart phone 57 is permitted to control, and a time and day range during which the smart phone 57 can access the vehicle 12, or both. Vehicle functions may include an ability to unlock/lock certain doors or compartments in the vehicle 12, to start/stop the vehicle propulsion system, control the audio system 34, or access GPS location data from the communications bus 44, to give a few examples.

In some implementations, the smart phone 57 can accept input from a user indicating the vehicle functions that the user would like access to. The smart phone 57 can then include those vehicle functions with the vehicle access certificate signing request along with a vehicle identifier and the wireless device public key. The smart phone 57 can then sign the certificate including the vehicle identifier, wireless public key, and requested vehicle functions with the wireless device private key. When the computer 18 receives the vehicle access certificate signing request, the computer 18 can identify the vehicle 12 the smart phone 57 wants access to in a database using the vehicle identifier. The computer 18 can maintain the database in which vehicles are identified by a vehicle identifier, such as a VIN, and one or more permissions are associated with the vehicle identifier. These permissions include the identities of smart phones that have permission to control the vehicle 12, the identity of the vehicle functions that can be controlled for each smart phone that has permission to access the vehicle, and the time/day during which the smart phone 57 has access to each of the vehicle functions.

When the computer 18 receives the vehicle access certificate, the computer 18 can identify the vehicle 12 in the database using the vehicle identifier, determine whether the smart phone 57 has permission to access the vehicle 12 based on the permissions associated with the vehicle identifier and the smart phone 57, and identify which of the vehicle functions included in the certificate the smart phone 57 can access. If the smart phone 57 can access all of the vehicle functions identified in the vehicle access certificate, the computer 18 can authenticate the certificate as it is. However, if the smart phone 57 is not permitted to access one or more of the vehicle functions requested in the vehicle access certificate, then the computer 18 can modify the certificate to remove the vehicle functions the smart phone 57 does not have permission to access. In addition to vehicle functions, the computer 18 can determine the time and day during which the smart phone 57 can access the vehicle 12. If the vehicle access certificate includes a time/day, the computer 18 can compare it with allowed times that are included with the vehicle identifier in the database. If the requested time is allowed, the computer 18 can leave the vehicle access certificate unmodified. And if the time window during which the smart phone 57 can access the vehicle 12 is not valid, the computer 18 can change the time values in the vehicle access certificate.

However, in other implementations, the computer 18 may receive the vehicle access certificate from the smart phone 57 without any identified vehicle functions. In that case, the computer 18 can extract the vehicle identifier from the vehicle access certificate, determine the vehicle functions the smart phone 57 has access to, and then insert those vehicle functions into the vehicle access certificate. The vehicle access certificate may also include the time and date the smart phone 57 created the certificate as well as any extensions used by the smart phone 57, such as a Bluetooth media access control (MAC) address or international mobile equipment identifier (IMEI). The method 200 proceeds to step 210.

At step 210, the vehicle access certificate is signed at the computer 18 using a central facility private key. The computer 18 includes a root certificate representing a cryptographic key pair belonging to the central facility; a central facility private key and a central facility public key. After determining the permissions the smart phone 57 is entitled to, the computer 18 can encode a time window during which the certificate is valid and then authenticate the vehicle access certificate signing request using the signature verification algorithm and the central facility private key. When the authenticated vehicle access certificate is received, its contents can be verified using the central facility public key. The method 200 proceeds to step 215.

At step 215, the authenticated vehicle access certificate is transmitted from the computer 18 to the smart phone 57 via the wireless carrier system 14. The computer 18 can wirelessly send the authenticated access certificate to the smart phone 57 via cell tower 70 using one of a number of possible cellular protocols. It is also possible to wirelessly transmit the authenticated vehicle access certificate from the computer 18 to the smart phone 57 via the Internet when the phone 57 is communicatively linked with a Wi-Fi hotspot or other similar WLAN connected to the Internet. The method 200 proceeds to step 220.

At step 220, the authenticated vehicle access certificate and a wireless device public key is transmitted from the smart phone 57 to the vehicle 12 via a short-range wireless communications protocol. The smart phone 57 can be paired with the vehicle 12 by presenting the authenticated vehicle access certificate to the vehicle 12. The smart phone 57 can establish a short-range wireless communications link with the vehicle telematics unit 30 of the vehicle 12 using a number of short-range wireless communications protocols. For example, using Bluetooth Low Energy (BLE), the smart phone 57 can wirelessly transmit the authenticated vehicle access certificate to the vehicle 12. The method 200 proceeds to step 225.

At step 225, the vehicle access certificate is authenticated at the vehicle 12 using a central facility public key. Prior to receiving the authenticated vehicle access certificate, the central facility private key can be stored at the vehicle 12. The central facility public key can be stored at the vehicle 12 at the time the vehicle is manufactured or these keys can be periodically provided to the vehicle 12 from the computer 18 or call center 20 via the wireless carrier system 14. When the vehicle 12 receives an authenticated vehicle access certificate, the vehicle 12 can access the central facility public key stored at the vehicle 12 and, using the hash function and the signature verification function, determine whether or not the computer 18 signed the certificate. If not authentic, the vehicle 12 may reject the certificate. However, when the vehicle 12 determines that the certificate is authentic, the vehicle 12 can generate a shared secret that will be cryptographically sent to the smart phone 57. In one implementation, the shared secret is created using a random number generator that creates a random number having a defined length. The method 200 proceeds to step 230.

At step 230, the shared secret is encrypted by the vehicle 12 using the wireless device public key and transmitted to the smart phone 57 via the short-range wireless communications protocol. Once the vehicle 12 has determined that the authenticated vehicle access certificate is valid, the vehicle 12 can use the wireless device public key and a public key encryption algorithm to encrypt the shared secret. The vehicle 12 can then transmit the shared secret to the smart phone 57 without regard to the security or encryption techniques used by the short-range wireless communication protocols used to send the shared secret. The method 200 proceeds to step 235.

At step 235, the received shared secret is decrypted at the smart phone 57 using the wireless device private key. After receiving the shared secret from the vehicle 12, the smart phone 57 can store the shared secret in its memory device for later retrieval when sending commands to control the vehicle 12.

Figure 3:
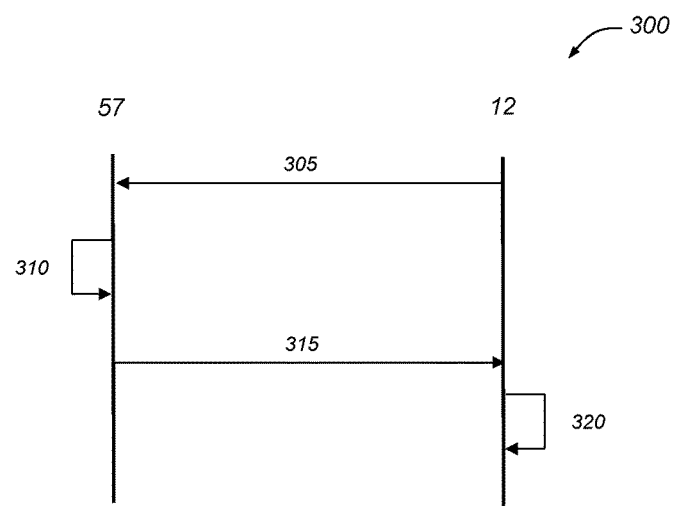
FIG. 3 is a communications flow depicting an embodiment of a method of implementing a challenge/response authentication.

At step 240, a command is generated at the smart phone 57 that controls one or more vehicle functions and transmitted to the vehicle 12 using short-range wireless communications techniques. Each time the smart phone 57 attempts to control the vehicle 12, the vehicle 12 can determine whether or not the command is valid using the shared secret. For example, if the smart phone 57 receives a command from a user via the smart phone display 59 to start the propulsion system, the smart phone 57 can encode this command as data in a message and send it to the vehicle 12 via BLE. The command is received by the vehicle telematics unit 30 of the vehicle 12 and authenticated by the vehicle 12 using the shared secret based on a variety of cryptographic techniques, such as a challenge/response mechanism, an embodiment of which is shown in FIG. 3. The authentication can be carried out by the vehicle telematics unit 30 or by one or more VSMs 42. When the vehicle 12 determines that the command is valid, it can then control the identified vehicle function(s).

Turning to FIG. 3, an embodiment of a method 300 of implementing the challenge/response authentication is shown that can be used to authenticate the commands sent from the smart phone 57 to the vehicle 12. After the shared secret is stored both at the vehicle 12 and the smart phone 57, the smart phone 57 can control vehicle functions by generating commands that are authenticated by the vehicle 12. The method 300 begins at step 305 by generating a random number at the vehicle 12. The vehicle 12 can use a random number generator implemented by the vehicle telematics unit 30 to generate a random number having a predetermined size or length. The vehicle challenge message can then be sent from the vehicle telematics unit 30 to the smart phone 57. The method 300 proceeds to step 310.

At step 310, the smart phone 57 receives the vehicle challenge message from the vehicle telematics unit 30 that includes the random number generated at the vehicle 12. The method 300 proceeds to step 315.

At step 315, a vehicle response message is created at the smart phone 57 that includes a cryptographic hash of the command controlling a vehicle function, the random number generated at the vehicle 12, and the shared secret. The vehicle challenge (e.g., the random number), the command, and the shared secret can be concatenated together and processed using one of a number of possible cryptographic hash functions. A plaintext version of the command can be included along with the vehicle response message or it can be sent prior to and apart from the vehicle response message. In some implementations the cryptographic hash function of method 300 can be a hash-based message authentication code, such as HMAC-SHA256 while other implementations use a cipher-based message authentication code (CMAC). However, it should be understood that other types of cryptographic hash functions could be used with equal success. The vehicle response message may then be transmitted from the smart phone 57 to the vehicle 12 via a short-range wireless protocol. The method 300 proceeds to step 320.

At step 320, the vehicle response message is received from the smart phone 57. The vehicle 12 can then verify the authenticity of the vehicle response message. Given that the vehicle 12 knows the shared secret, the vehicle challenge it sent, and the command, the vehicle 12 can use the cryptographic hash function to compute a verification output. The vehicle 12 can compare its verification output with the vehicle response message. When vehicle 12 determines that the verification output matches the vehicle response message received from the smart phone 57, access to or control of the vehicle function can be granted. In this example, the vehicle response message can also indicate to the vehicle the order in which the random number, the shared secret, and the command were concatenated such that the vehicle can successfully reproduce the hashed output.

Rather than initiating the challenge/response process at the vehicle 12, it is also possible in some implementations to initiate and complete a challenge/response process at the smart phone 57 in addition to performing the challenge/response process initiated at the vehicle 12. By using two separate challenge/response processes, both the vehicle 12 and the smart phone 57 can authenticate the receiving entity. Also, it should be understood that the central facility can remotely revoke the authenticated vehicle access certificate. When the central facility receives a request to terminate the authenticated vehicle access certificate, the central facility can transmit an instruction from the central facility to the vehicle telematics unit 30 via the wireless carrier system 14 that includes the identity of a particular wireless device and an executable command directing the unit 30 to erase the wireless device public key and any other data included in the authenticated vehicle access certificate belonging to the identified wireless device. Or in another example, the vehicle 12 can add a particular authenticated vehicle access certificate to a blacklist maintained in a memory device at the vehicle 12.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of regulating access to a vehicle from a wireless device communicating using short-range wireless communications, comprising the steps of:
    (a) transmitting a vehicle access certificate signing request from the wireless device to a central facility, wherein the vehicle access certificate signing request includes a wireless device public key and a vehicle identifier, and the central facility is configured to use the vehicle identifier to verify whether the wireless device is authorized to control one or more operations of the vehicle;
    (b) receiving an authenticated vehicle access certificate from the central facility in response to the vehicle access certificate signing request and in response to the verification by the central facility that the wireless device has authorization to control the one or more operations of the vehicle, wherein the authenticated vehicle access certificate is signed using a central facility private key and includes the wireless device public key;
    (c) transmitting the authenticated vehicle access certificate containing the wireless device public key from the wireless device to the vehicle via a short-range wireless communications protocol;
    (d) receiving from the vehicle a shared secret that is encrypted by the wireless device public key;
    (e) decrypting the received shared secret using a wireless device private key;
    (f) generating a command, controlling one or more vehicle functions, that is authenticated using the shared secret; and
    (g) transmitting the command from the wireless device to the vehicle.

2. The method of claim 1, wherein the command controlling one or more vehicle functions is authenticated by:
    receiving at the wireless device a vehicle challenge message including a random number that is generated and sent from the vehicle;
    generating a vehicle response message that includes a cryptographic hash of the random number, the shared secret, and the command; and
    transmitting the vehicle response message from the wireless device to the vehicle via the short-range wireless protocol.

3. The method of claim 1, further comprising the step of storing the decrypted shared secret at the wireless device along with a vehicle identifier.

4. The method of claim 1, wherein the wireless device does not include cellular communications functionality.

5. The method of claim 1, wherein the vehicle access certificate signing request includes one or more entitlements for controlling vehicle functions.

6. The method of claim 1, wherein the authenticated vehicle access certificate received from the central facility includes entitlements for controlling vehicle functions that have been added or changed by the central facility.

7. The method of claim 1, further comprising the step of generating the wireless device private key and the wireless device public key at the wireless device.

* * * * *